United States Patent [19]
Ott et al.

[11] Patent Number: 5,460,134
[45] Date of Patent: Oct. 24, 1995

[54] TRANSMITTER ARRANGEMENT FOR CYLINDER IDENTIFICATION IN AN INTERNAL COMBUSTION ENGINE HAVING N CYLINDERS

[75] Inventors: Karl Ott, Markgroeningen; Helmut Denz, Stuttgart; Dietmar Flaetgen, Vaihingen/Enz, all of Germany

[73] Assignee: Robert Bosch GmbH, Stuttgart, Germany

[21] Appl. No.: 87,687

[22] PCT Filed: Nov. 19, 1992

[86] PCT No.: PCT/DE92/00964

§ 371 Date: Nov. 15, 1993

§ 102(e) Date: Nov. 15, 1993

[87] PCT Pub. No.: WO93/12333

PCT Pub. Date: Jun. 24, 1993

[30] Foreign Application Priority Data

Dec. 18, 1991 [DE] Germany .......................... 41 41 713.5

[51] Int. Cl.[6] .................................................. F02M 51/00
[52] U.S. Cl. ........................ 123/476; 123/414; 123/479
[58] Field of Search ............................... 123/414, 476, 123/477, 500, 501, 617, 612, 613, 479, 630; 324/391, 392

[56] References Cited

U.S. PATENT DOCUMENTS

| | | | |
|---|---|---|---|
| 3,883,795 | 5/1975 | Klein | 324/392 |
| 4,089,316 | 5/1978 | Padgitt | 324/391 |
| 4,284,052 | 8/1981 | Hanisko . | |
| 4,664,082 | 5/1987 | Suzuki | 123/414 |
| 4,765,306 | 8/1988 | Scarnera | 123/617 |
| 4,797,828 | 1/1989 | Suzuki | 123/479 |
| 4,825,691 | 5/1989 | Sekigochi | 123/479 |
| 5,042,449 | 8/1991 | Dasetto | 123/630 |
| 5,099,811 | 3/1992 | Frantz | 123/414 |
| 5,209,202 | 5/1993 | Maurer | 123/479 |
| 5,329,904 | 7/1994 | Kokubo | 123/414 |

FOREIGN PATENT DOCUMENTS

| | | | |
|---|---|---|---|
| 0371158 | 6/1990 | European Pat. Off. . | |
| 2637652 | 4/1990 | France . | |
| 0371158 | 5/1990 | France . | |
| 3608321 | 9/1987 | Germany . | |
| 0062364 | 4/1983 | Japan | 123/414 |
| 0148274 | 9/1983 | Japan | 324/391 |
| 0173562 | 10/1984 | Japan | 123/414 |
| 1134069 | 6/1989 | Japan . | |
| 2198853 | 6/1988 | United Kingdom | 324/391 |

*Primary Examiner*—Carl S. Miller
*Attorney, Agent, or Firm*—Michael J. Striker

[57] ABSTRACT

A transmitter arrangement for cylinder identification in an internal combustion engine having n cylinders, the arrangement comprises a transmitter disc driveable by a crankshaft of the internal combustion engine and having a plurality of angle marks and at least one distinguishable reference mark allocated to a fixed crankshaft angle, a transmitter disc driveable by a camshaft of the internal combustion engine and rotating half as quickly, the transmitter disc having a number of segments corresponding to the cylinder number n, the segments having two different lengths and two interspaces of different lengths between two segments each, two stationary pick-ups allocated to the transmitter discs and transmitting as a function of the marks passing by output signals having low phases and high phases, a control unit evaluating signals from the stationary pick-ups, the angle marks being arranged such that the output signal of each of the pick-ups contains during a first crankshaft revolution a sequence of low phases and high phases differing from that during a second crankshaft revolution, the angle marks being arranged also so that all spacings between same edges of one phase are the same, a number of angle marks corresponds to the number of cylinders n, and a position of the reference mark is selected such that a signal caused by it occurs with one phase of a camshaft signal during the first revolution of the crankshaft and with the other phase during the second revolution of the crankshaft.

12 Claims, 4 Drawing Sheets

TRANSMITTER ARRANGEMENT FOR CYLINDER IDENTIFICATION IN AN INTERNAL COMBUSTION ENGINE HAVING N CYLINDERS

BACKGROUND OF THE INVENTION

The present invention relates to a transmitter arrangement for cylinder identification in an internal combustion engine having n cylinders.

It is known that in a four-stroke internal combustion engine the crankshaft rotates twice per working cycle and thus sweeps out an angle of 720 degrees before a specific cylinder re-assumes the same working position. In order to detect the instantaneous position of a cylinder, it is therefore not sufficient to determine the angular position of the crankshaft within a revolution; it must be detected, rather, whether the internal combustion engine is currently in the first or in the second half of the working cycle, corresponding to the first or second crankshaft revolution.

For this purpose, it is known from EP 0,371,158, for example, to provide in addition to a crankshaft transmitter a static camshaft transmitter as well, the periodic output signal of which consists of two distinguishable component signals which extend in an alternating fashion over one full crankshaft revolution in each case. A crankshaft transmitter additionally supplies a reference signal per crankshaft, by means of which a known angular position, the synchronisation position, is determined. Only after identification of the reference pulse is the position of the cylinder of the internal combustion engine accurately known in conjunction with the camshaft signal, and synchronisation of the ignition or injection can be performed.

It follows that after the start of the internal combustion engine it is possible in the most unfavourable case for a complete crankshaft revolution to pass until the synchronisation position is first reached. Since it is only possible after synchronisation to inject fuel into the individual cylinders correctly in the cycle, in order to avoid a prolonged starting phase due to lack of injection during the first crankshaft revolution a first cylinder group is determined in the known method, into which injection is firstly performed in conjunction with the evaluation of the first component signal of the camshaft transmitter after the start. After a change in signal of the signal supplied by the camshaft transmitter, injection is also performed into the second cylinder group.

The known method therefore displays a possibility of how the injection can be improved directly after the start of the internal combustion engine; a quicker cylinder identification is not achieved in the process, nor is it, indeed, mandatory in this case.

German Offenlegungsschrift 3,608,321 discloses a device for detecting the cylinder-specific crankshaft position of a four-stroke engine having a cylinder number n, in which a signal transmitter connected to the crankshaft is subdivided on the circumference into n/2 equally large signal marking sections with one identifying mark in each case, and a signal transmitter connected to the camshaft is subdivided into n/2 or n equally large signalling sections whose uniform divisions diverge from one another. Immediately after the engine has been started, a cylinder allocation of the crankshaft position can be performed by a pulse comparison of the two signal transmitters that is synchronised by means of the identifying marks. A disadvantage of this device consists in that the distance between similar angle mark edges of the camshaft transmitter is non-uniform, so that it is not suitable for use as a trigger mark; this is disadvantageous in particular when emergency running is to be realised in the event of a defective crankshaft transmitter.

SUMMARY OF THE INVENTION

Accordingly, it is an object of the present invention to provide a transmitter arrangement for cylinder identification in an internal combustion engine having n cylinders, which avoids the disadvantages of the prior art.

In keeping with these objects and with others which will become apparent hereinafter, one feature of the present invention resides, briefly stated, in a transmitter arrangement for cylinder identification in an internal combustion engine having n cylinders, in which in accordance with the present invention, the arrangement of the angle marks is performed also such that all the spacings between the same edges of the one phase are the same, the number of angle marks corresponds to the cylinder number n, and the position of the reference mark is selected such that the signal caused by it occurs with one phase of the camshaft signal during a first revolution of the crankshaft, and with the other phase during the second revolution of the crankshaft.

The transmitter arrangement according to the invention, which serves the purpose of cylinder identification in an internal combustion engine having n cylinders and has the characterising features of the main claim, has, by contrast, the advantage that directly after the start of the internal combustion engine a particularly quick and reliable cylinder identification is performed, since as a consequence of the advantageous configuration of the camshaft disc the combination of the crankshaft transmitter signal and camshaft transmitter signal supplies uniquely identifiable pulse trains.

Immediate cylinder identification is advantageously possible, since the pulse train of the camshaft transmitter signal during the first crankshaft revolution differs uniquely from the pulse train during the second crankshaft revolution.

The special configuration of the camshaft transmitter disc ensures that one of the pulse edges, for example the trailing edge, occurs at the same distance, referred to the crankshaft, for all marks. This enables emergency running of the internal combustion engine in a particularly advantageous way in the case when the crankshaft transmitter is defective.

Further advantageous embodiments of the transmitter arrangement according to the invention are specified in the subclaims.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
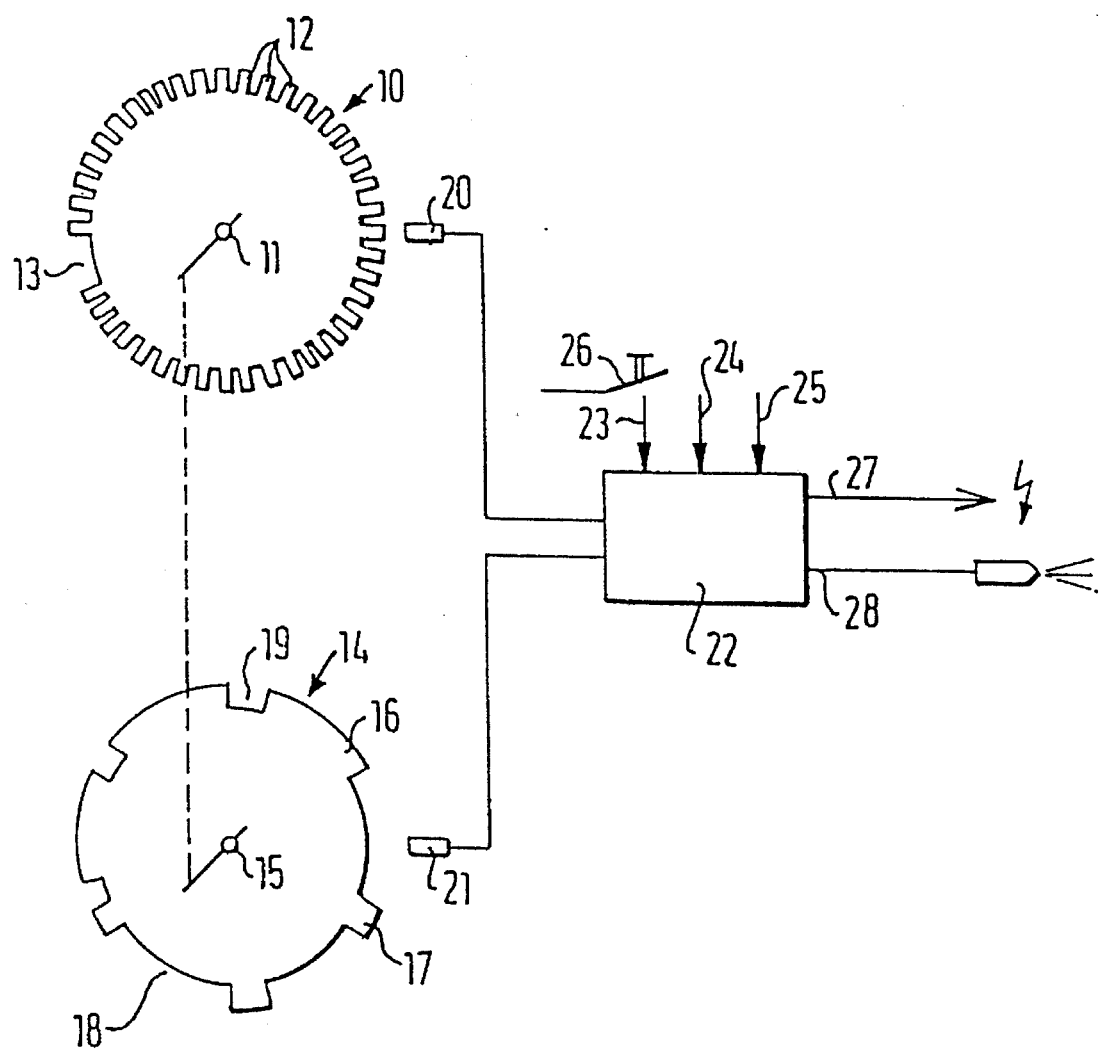
FIG. 1 shows a coarse overview of the transmitter arrangement according to the invention, and (FIGS. 2 and 3 provide timing diagrams as well as combinations of pulses possibly occurring,) FIG. 2 applying to a six-cylinder engine and FIG. 3 to an eight-cylinder engine.

The most essential elements of the present invention in connection with an internal combustion engine control system are represented in FIG. 1 in a coarse overview. In this case, 10 denotes a transmitter disc which is rigidly connected to the crankshaft 11 of the internal combustion engine and has on its circumference a multiplicity of similar angle marks 12.

Provided in addition to these similar angle marks 12 is a reference mark 13 which in the exemplary embodiment according to FIG. 1 is formed by two missing angle marks.

A second transmitter disc 14 is connected to the camshaft 15 of the internal combustion engine and has on its circumference segments of different length, the shorter ones being denoted by 17 and the longer by 16. There are interspaces between these angle marks, the shorter being denoted by 19 and the longer by 18, respectively.

The number of segments 16, 17 is selected such that it corresponds precisely to the cylinder number n; the precise arrangement of the segments will be described at another point.

The two transmitter discs 10, 14 are scanned by pick-ups 20, 21, for example inductive pick-ups or Hall probes; the signals generated in the pick-ups as the angle marks pass by are fed to a control unit 22 and further processed there. The transmitter disc 10 and the pick-up 20 are referred to below as camshaft transmitter, and the transmitter disc 14 and the pick-up 21 are referred to as crankshaft transmitter.

The control unit 22 receives via inputs 23, 24, 25 further input variables necessary for controlling the internal combustion engine, examples being a temperature signal via the input 25, a load signal via the input 24 and an "ignition on" signal via the input 23; 26 denotes the associated ignition switch. On the output side, the control unit provides signals for ignition and injection for corresponding components (not denoted in more detail) of the internal combustion engine; the outputs of the control unit are denoted by 27 and 28.

Figure 2:
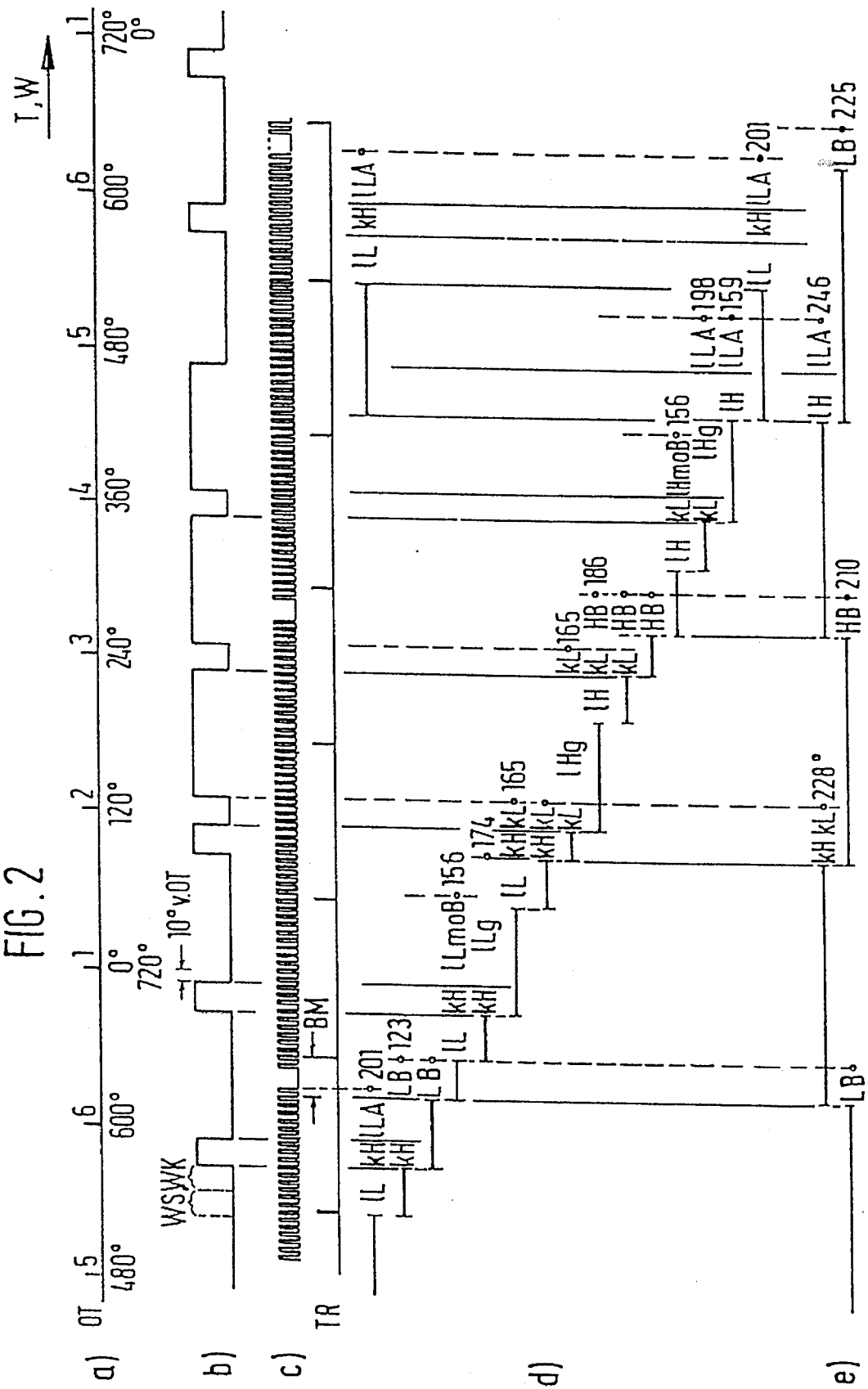

Plotted respectively against crankshaft angle W and time T in FIG. 2 are the signals supplied by the pick-ups 20 and 21, which are evaluated in the control unit.

In detail, the crankshaft angle is plotted in FIG. 2a during two and a half revolutions of the crankshaft; FIG. 2b shows the signal from the camshaft pick-up; and FIG. 2c shows the signal from the crankshaft pick-up 21. In addition, the TDC position of the cylinders 1 to 6 and the TR pulse which occurs at each positive segment edge are drawn in.

The following requirements are to be placed on the transmitter system to ensure that the signal set-up represented in FIG. 2 is obtained:

The transmitter disc 14 connected to the camshaft 15 is designed such that in the ignition interval the camshaft transmitter signal produces long low-phases and short high-phases, with a negative edge in the emergency running ignition angle, via a first crankshaft revolution of the internal combustion engine. During the second revolution, long high-phases and short low-phases are to be obtained, likewise with a negative edge in the emergency running ignition angle. For this purpose, the transmitter wheel is configured such that three long segments 16 are respectively followed by three short segments 17, long interspaces 18 being resepctively situated between the short segments, and there being short interspaces 19, respectively, between the long segments 16 and a shorter or a longer interspace between the short and long segments.

If it is necessary because of the characteristics, for example, of a Hall probe (premature switching on at the positive edge and late switching off at the negative edge), the mechanical short segments of the transmitter wheel can be configured smaller than the short interspaces, so that in the electrical signal the short low-phases and the short high-phases are approximately the same length. FIG. 3b' shows this in principle.

Otherwise, the transmitter system is to be designed such that in the electrical signal the short high-phases and low-phases are as short as possible in comparison with the long high-phases and low-phases. It is ensured in this way that a sufficient difference results between the short time TK and the long time TL when counting out the time even in the dynamic case, that is to say during acceleration.

The exemplary embodiment according to FIG. 1 is configured such that in each case the trailing edges of the signals according to FIG. 2b or, correspondingly, according to FIG. 3b have identical spacings. A transmitter wheel, in which the lengths of the segments and of the interspaces are interchanged, would supply leading edges having equidistant spacings.

The reference mark 13 of the crankshaft disc 10 is arranged such that the pulse gap caused by it occurs either within the low phase, caused by the middle long interspace, of the camshaft transmitter signal, or within the high phase, caused by the middle long segment, of the camshaft transmitter signal.

Use can be made as camshaft pick-up 21 of a static pick-up which supplies a unique signal allocation even in the case of a stationary internal combustion engine, but it is also possible to use a quasi-static transmitter by means of which evaluation can then be started only after an edge change of the camshaft transmitter signal.

Evaluation in normal operation.

In normal operation, with functioning crankshaft transmitter and camshaft transmitter, the level of the camshaft transmitter signal is interrogated after the start for each tooth edge of the crankshaft transmitter signal. At the same time, the tooth edges supplied by the crankshaft transmitter are counted in the control unit. After a specific angle W, it is possible to identify from the number of the tooth edges at the same level whether a short or a long segment or a short or a long interspace is involved.

If, in addition, a safety angle WS is further taken into account, a long segment can be identified, for example after an angle W=WK+WS. A value of approximately 18° CrS is sensible as the magnitude of the safety angle.

Should a renewed change in level occur after a transition in level from low to high within WK+WS, a short high-phase is involved, and should no change in level occur within WK+WS for an existing low level, a long low-phase is involved.

Should one of these two cases occur, the revolution 1 of the crankshaft is identified. Checking for reverse polarity is carried out analogously for the revolution 2.

It is therefore already known after the short angle WK+WS whether the first or the second revolution of the crankshaft is being dealt with. The cylinder group identification is therefore already concluded after this angle, and a first starting injection is possible for selected cylinders of this cylinder group.

Apart from the phases of the camshaft transmitter signal, the occurrence of the reference mark of the crankshaft transmitter is also examined in addition for the purpose of cylinder identification. A distinction is made in this case as to whether a reference mark 13 occurs at the low or high phase level. The cylinder identification is realised by means of this interrogation after 390° CrS at the latest, even in the prior art.

The explanation of the accelerated cylinder identification which now follows requires the introduction of the following definitions for the phases:

lL: long low
lH: long high
kL: short low
kH: short high
LB: low with reference mark
HB: high with reference mark
lLA: long low start
lLmoB: long low minimum without reference mark
lHmoB: long high minimum without reference mark
lLg: long low whole
lHg: long high whole The phases thus defined can be determined in each case by counting out a specific number of crankshaft tooth edges from or up to one, or between two camshaft edges. As many successive phases are now evaluated as enable a unique allocation.

If the evaluation starts at a crankshaft angle of approximately 480° (degrees), long low (lL) occurs as first phase in the exemplary embodiment shown. The next phase is then short high (kH), and the next but one long low with start (lLA). The synchronisation is then concluded after an angle of rotation of approximately 201° at the latest in the case of the black circle indicated. The numbers after the black points or circles indicate the respective largest angle at which the synchronisation is concluded.

If the reference mark is always identified when in the case of the signal according to 2c a short spacing is followed by a longer and then again by a shorter one, the reference mark at the point BM of FIG. 2c is identified.

If the start of rotation occurs at another position, for example at approximately 550°, so that the evaluation starts with the first short high-phase, the phase combination plotted in row 2 of FIG. 2d, namely short high, low with reference mark, occurs. Corresponding combinations are produced for another start of rotation or start of evaluation; all these possible combinations are plotted in FIG. 2d.

A comparison of the successive phases from the start of rotation with the possible combinations filed in a memory of the control unit 22 then permits a unique allocation, since none of these combinations is repeated. In the worst case, it is thus possible to detect the CrS position and to make a cylinder allocation after approximately 200° CrS. For this purpose, at the instant of an identified phase sequence, an angle clock which runs from 0° to 720° CrS and is a component of the control unit or of a computing device (μC) is set to the associated value for the purpose of determining the crankshaft position.

In a sequential injection system such as is disclosed, for example, in German Offenlegungsschrift 3,623,041, an angle clock running in this case, it is therefore possible, depending on the reading of the angle clock and on the detected speed and the computed injection period, for the injection to be performed simultaneously for the valves in which the end of injection occurs at the latest at a desired angle of the associated cycle, for example 30° CrS before "inlet closes". The normal sequential injection is performed thereafter.

In order to increase the reliability of the cylinder identification, it is further possible to perform before the start of the ignition output a plausibility check in which, after cylinder identification has been performed, use is also further made of one or two of the subsequent phase. Further plausibility checks are possible, in which the pulse number of the crankshaft signal is counted out between the reference mark and the next positive edge of the camshaft transmitter signal. Since after injection has been performed the mixture first has to be sucked in and compressed, the ignition output can be performed somewhat later after reassuring the cylinder identification, without the start duration thereby being prolonged.

It is likewise possible to evaluate using a reduced number of phases and a somewhat longer synchronisation period. In particular, a simplified method is specified in FIG. 2e, in which only four characteristic phase sequences are evaluated.

Figure 3:
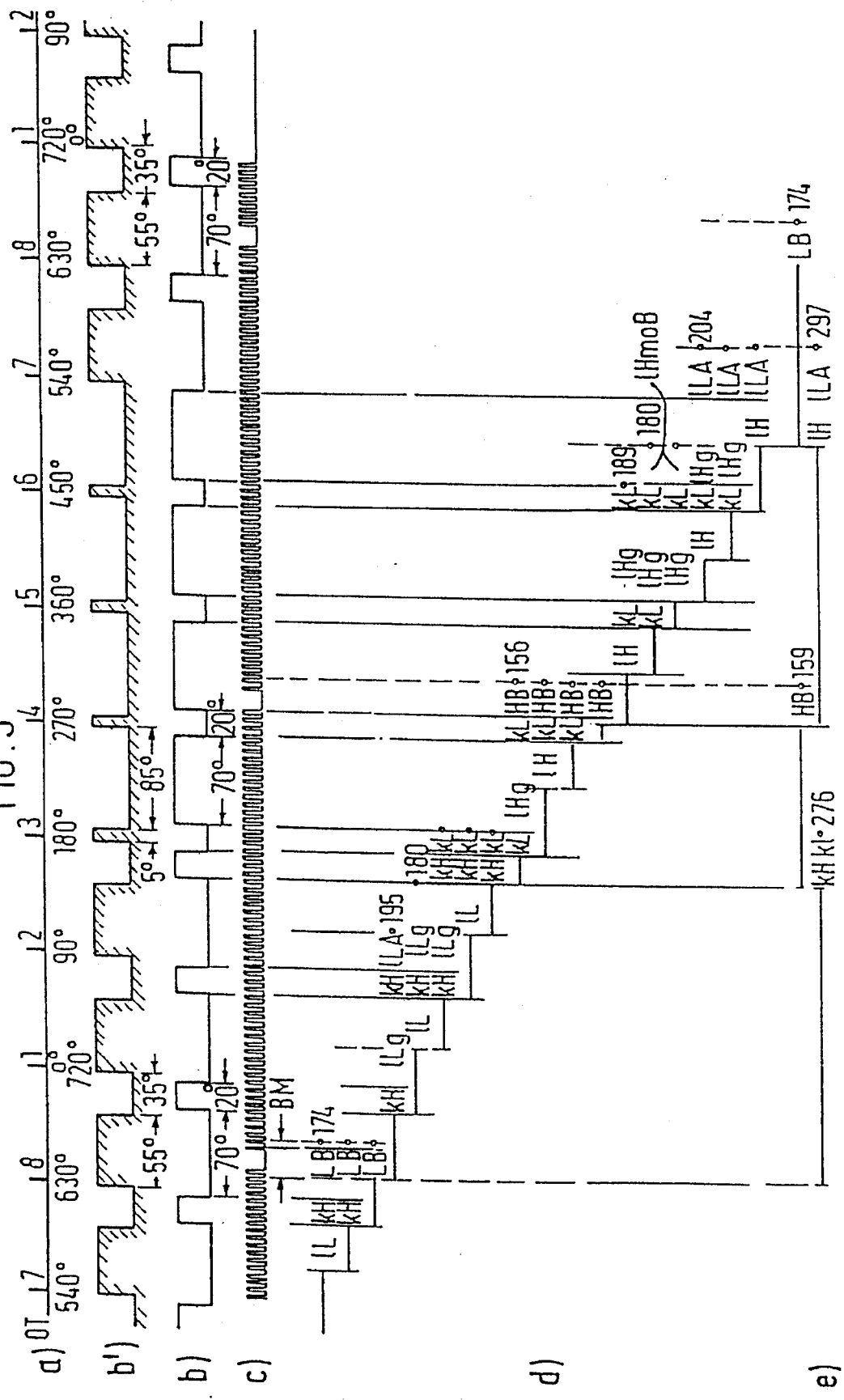

The relationships for an eight-cylinder engine are represented in FIG. 3. In this case, the camshaft disc correspondingly has four short and four long segments, as well as four short and four long interspaces. The output signal supplied by the camshaft transmitter is represented in FIG. 3b, and the crankshaft signal according to FIG. 3c is identical to the crankshaft signal according to FIG. 2.

Plotted in FIG. 3d are the phase relationships for a start with a long low-phase which is followed by a short high-phase and then a low phase with reference mark (row 1). Plotted in row 2 is the phase sequence which is obtained in the case of a start with a short high-phase; there then follows as next phase a long low-phase with reference mark.

As may be gathered from the phase sequence specified in FIG. 3d, in order to permit a unique allocation it is necessary for some of the combinations which can occur during a crankshaft revolution of 720 degrees to be evaluated over four phase sequences.

Represented, in turn, in FIG. 3e is a simplified evaluation. By a more favourable selection of the reference mark, it would be possible here, as well, to design the angular ranges up to synchronisation to be approximately of the same size.

If the accelerated cylinder identification described above is renounced and the normal ignition output is carried out only after an identified reference mark in conjunction with the camshaft transmitter signal, a substantial software simplification is achieved, and yet immediate cylinder group identification is nevertheless possible.

The method can be transferred analogously to other numbers of cylinders.

The camshaft transmitter segments are drawn in in FIG. 3b. The length of these segments is selected such that the signal shown in 3b is obtained, taking account of the known property of the Hall transmitters, which already switch somewhat before the occurrence of the positive segment edge and somewhat after the occurrence of the negative segment edge.

Emergency running via camshaft transmitter

Figure 4:
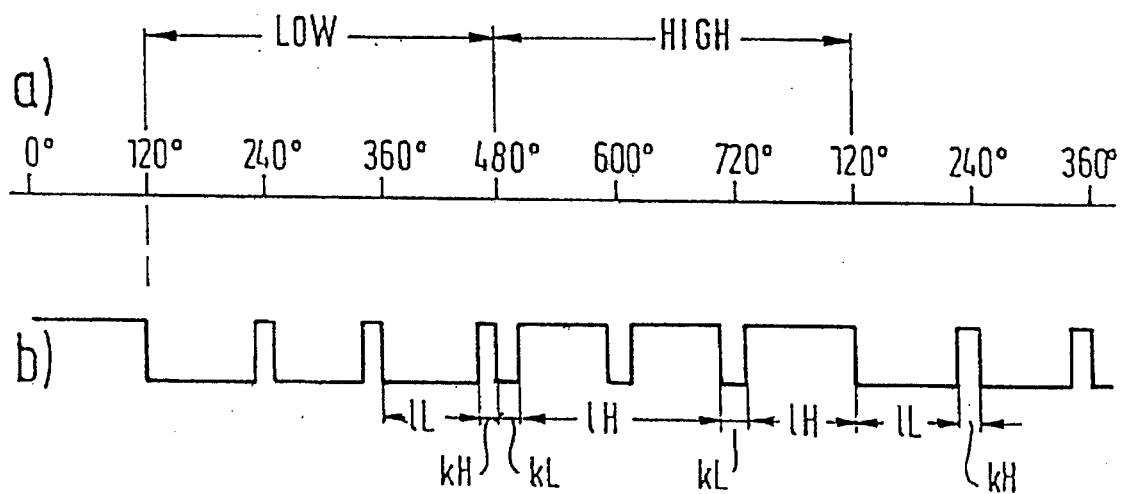
FIGS. 4 and 5 represent timing diagrams for explaining the emergency running function.

In the event of a failure of the crankshaft transmitter signal, cylinder identification is possible only from the camshaft transmitter signal. For this purpose, the times between the camshaft transmitter edges are counted out. Cylinder identification is rendered possible from the individual counted sequences, even in the dynamic case: the mode of procedure for the evaluation is represented in FIG. 4. The sequences lL, kH, kL, lH and the sequence kL, lH, lL, kH specified in FIG. 4d permit a unique cylinder identification through comparison with stored sequences, because both sequences occur only once during the crankshaft angle of 720 degrees, and are therefore unique.

Figure 5:
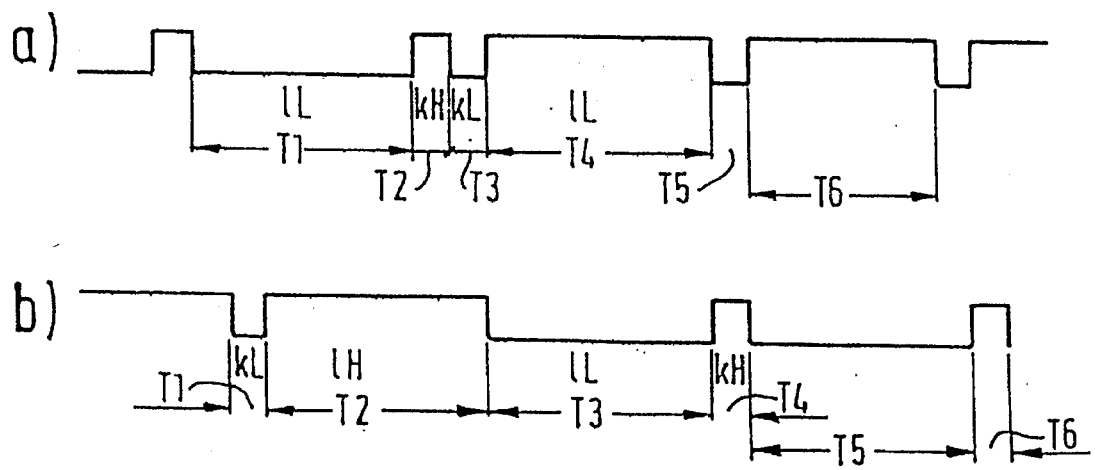

A possible interrogation for the time comparison required for cylinder identification in the case of emergency running, if necessary with assurance, is specified in FIGS. 5a, b; the times T1 to T6 enable identification on the assumption that it holds that:

T2<T1/2 and T3<T4/2; T6/2<T5 or
T1<T2/2 and T4<T3/2; T5/2<T6. or:
T2<T1 and T3<T4; T6<T5 or
T1<T2 and T4<T3; T5<T6.

The output of the ignition and injection in emergency running can be performed according to a method such as is described, for example, in German Offenlegungsschrift 4,005,123, in which case use is made as trigger marks of the negative edges of the camshaft transmitter signal which respectively occur at a fixed angular spacing.

It is possible, furthermore, to generate by means of software from the angularly fixed trailing edges of the camshaft transmitter signal a signal which corresponds to the crankshaft transmitter signal plotted in FIG. 4c.

The leading edges could be correspondingly evaluated in the case of an inverted CaS transmitter disc.

It will be understood that each of the elements described above, or two or more together, may also find a useful application in other types of constructions differing from the types described above.

While the invention has been illustrated and described as embodied in a transmitter arrangement for cylinder identification in an internal combustion engine having n cylinders, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A transmitter arrangement for cylinder identification in an internal combustion engine having n cylinders, the arrangement comprising a transmitter disc driveable by a crankshaft of the internal combustion engine and having a plurality of angle marks and at least one distinguishable reference mark allocated to a fixed crankshaft angle; a transmitter disc driveable by a camshaft of the internal combustion engine and rotating half as quickly, said transmitter disc having a number of segments corresponding to the cylinder number n, said segments having two different lengths and two interspaces of different lengths between two segments each; two stationary pick-ups allocated to said transmitter discs and transmitting as a function of said marks passing by output signals having low phases and high phases; a control unit evaluating signals from said stationary pick-ups, said angle marks being arranged such that the output signal of each of said pick-ups contains during a first crankshaft revolution a sequence of low phases and high phases differing from that during a second crankshaft revolution, said angle marks being arranged also so that all spacings between same edges of one phase are the same, a number of angle marks corresponds to the number of cylinders n, and a position of said reference mark is selected such that a signal caused by it occurs with one phase of a camshaft signal during the first revolution of the crankshaft and with the other phase during the second revolution of the crankshaft.

2. A transmitter arrangement as defined in claim 1, wherein said control unit is formed so that a sequence of the low phases and high phases of the output signals of said two pick-ups is identified and a comparison with stored sequences is performed for cylinder identification, and after the cylinder identification has been performed a crankshaft position is allocated.

3. A transmitter arrangement as defined in claim 1, wherein said control unit is formed so that a sequence of the low phases and high phases of the output signals of said two pick-ups is identified and a comparison with stored sequences is performed for cylinder identification, and after the cylinder identification has been performed an angle clock running from 0° to 720° CrS is set to an associated value.

4. A transmitter arrangement as defined in claim 2, wherein said control unit is also formed so that after the cylinder identification has been performed an angle clock running from 0° to 720° CrS is set to an associated value.

5. A transmitter arrangement as defined in claim 1, wherein said transmitter discs and said pick-ups are formed so as to provide as many phases as necessary to render a specific cylinder allocation.

6. A transmitter arrangement as defined in claim 1, wherein said segments and said interspaces include long and short segments and long and short interspaces, said short segments being narrower than said short interspaces, so that high and low phases of short and long duration of approximately same lengths are produced in a transmitter signal.

7. A transmitter arrangement as defined in claim 1, wherein half of said segments are segments of a short type and half of said segments are segments of a long type, segments of one of said types being arranged one behind the other.

8. A transmitter arrangement as defined in claim 1, wherein said marks are arranged so that the edges having same spacings are trailing edges of the high phases.

9. A transmitter arrangement as defined in claim 1, and further comprising a switch for emergency running in the event of failure of a crankshaft transmitter signal, said edges having edges with same spacings which in case of starting control a start of closure with subsequent ignition and injection.

10. An internal combustion engine, comprising n cylinders; a sequential injection system having a plurality of injection valves; a crankshaft; a camshaft; and a transmitter arrangement for cylinder identification comprising a transmitter disc driveable by said crankshaft of said internal combustion engine and having a plurality of angle marks and at least one distinguishable reference mark allocated to a fixed crankshaft angle, a transmitter disc driveable by said camshaft of said internal combustion engine and rotating half as quickly, said transmitter disc having a number of segments corresponding to said cylinder number n, said segments having two different lengths and two interspaces of different lengths between two segments each, two stationary pick-ups allocated to said transmitter discs and transmitting as a function of said marks passing by output signals having low phases and high phases, a control unit evaluating signals from said stationary pick-ups, said angle marks being arranged such that said output signal of each of said pick-ups contains during a first crankshaft revolution a sequence of low phases and high phases differing from that during a second crankshaft revolution, said angle marks being arranged also so that all spacings between same edges of one phase are the same, a number of angle marks corresponds to said number of cylinders n, and a position of said reference mark is selected such that a signal caused by it occurs with one phase of a camshaft signal during said first revolution of said crankshaft and with said other phase during said second revolution of said crankshaft, said injection valves being simultaneously controlled in accordance with an identified position of said crankshaft during synchronization, a detected speed and a computed injection period, an injection pulse of said injection valves being terminated at the latest at the desired angle of an associated working cycle, and subsequently a normal sequential injection is started.

11. An internal combustion engine as defined in claim 10, wherein said sequential injection system is formed so that an injection is started immediately after a first identified cylinder allocation, but before output of a first ignition there is further a reassurance of a correct cylinder allocation.

12. An internal combustion engine as defined in claim 10; and further comprising an angle clock formed so that a position of said crankshaft can be determined from reading of said angle clock.

* * * * *